US012675000B2

(12) United States Patent
Pellicer Ramo

(10) Patent No.: US 12,675,000 B2
(45) Date of Patent: Jul. 7, 2026

(54) RIM LOCK FOR EYEGLASSES,
EYEGLASSES AND METHOD OF ASSEMBLY

(71) Applicant: ETNIA EYEWEAR CULTURE S.L.,
Barcelona (ES)

(72) Inventor: David Pellicer Ramo, Barcelona (ES)

(73) Assignee: ETNIA EYEWEAR CULTURE, S.L.,
Barcelona (ES)

( * ) Notice: Subject to any disclaimer, the term of this
patent is extended or adjusted under 35
U.S.C. 154(b) by 658 days.

(21) Appl. No.: 18/157,306

(22) Filed: Jan. 20, 2023

(65) Prior Publication Data

US 2023/0314835 A1 Oct. 5, 2023

(30) Foreign Application Priority Data

Feb. 11, 2022 (EP) .................................... 22382112

(51) Int. Cl.
*G02C 5/22* (2006.01)
*G02C 1/08* (2006.01)

(52) U.S. Cl.
CPC ................. *G02C 5/22* (2013.01); *G02C 1/08*
(2013.01); *G02C 2200/06* (2013.01); *G02C*
*2200/20* (2013.01)

(58) Field of Classification Search
CPC .......... G02C 1/08; G02C 5/22; G02C 5/2281;
G02C 2200/06
USPC ........................................................ 351/141
See application file for complete search history.

(56) References Cited

U.S. PATENT DOCUMENTS

| | | | |
|---|---|---|---|
| 4,339,179 A | 7/1982 | Dany | |
| 4,776,685 A | 10/1988 | Jeunet | |
| 4,904,077 A | 2/1990 | Drlik | |
| 5,235,356 A | * 8/1993 | Israel | G02C 5/22 |
| | | | 351/141 |
| 5,488,440 A | 1/1996 | Fukuoka | |
| 6,086,201 A | * 7/2000 | Huber | G02C 1/08 |
| | | | 351/140 |
| 2006/0164594 A1* | 7/2006 | Xiao | G02C 1/08 |
| | | | 351/141 |

(Continued)

FOREIGN PATENT DOCUMENTS

| | | | |
|---|---|---|---|
| EP | 0542157 A1 | 5/1993 | |
| JP | 2005283620 A | * 10/2005 | |
| WO | 2019203592 A1 | 10/2019 | |

OTHER PUBLICATIONS

Extended European Search Report dated Jul. 25, 2022 in corresponding European Patent Application No. 22382112.5, 5 pages.

*Primary Examiner* — Nicholas R. Pasko

(74) *Attorney, Agent, or Firm* — Maier & Maier, PLLC

(57) ABSTRACT

A rim lock for an eyeglass frame, including: a screw which
includes a screw head and a threaded part, the screw head
includes a screw drive; and, a casing including a first portion
which includes a first side, a second side, a first hole that
extends between two opposite surfaces of the first side, a
second hole that extends between two opposite surfaces of
the second side, the first and second sides being opposite to
each other, and where the first portion defines a hollow
cavity; and the casing further includes a second portion
which includes a third hole; where the screw head fits in the
hollow cavity with the screw drive facing the first hole, the
screw head has a larger diameter than the first and second
holes.

12 Claims, 3 Drawing Sheets

(56) References Cited

U.S. PATENT DOCUMENTS

2022/0091434 A1 *  3/2022  Montalban ............. G02C 5/146

* cited by examiner

RIM LOCK FOR EYEGLASSES, EYEGLASSES AND METHOD OF ASSEMBLY

TECHNICAL FIELD

The present disclosure concerns a rim lock for eyeglasses. The invention also concerns an eyeglass frame incorporating said rim lock, and a method of assembly of the rim lock in an eyeglass frame.

BACKGROUND

The installation of lenses in eyeglasses may be facilitated by having a discontinuous portion in an eyeglasses frame, and a device, typically known as "rim lock", that allows the opening/closing of said gap. Conventional rim locks often comprise two portions each of which is attached to two respective separated parts of an eyeglass frame and a screw that joins both portions of the rim lock together. Consequently, by virtue of the rim lock, each of the lenses can be locked in an appropriate position.

However, the installation of eyeglass lenses using conventional rim locks may become difficult due to the small size of the screw used for connecting both rim lock's portions. During the installation, it is common that the screw may fall and/or get lost. Additionally, the screwdriver may slip off, presenting a potential risk of damaging eyeglasses parts or harming the user. Even skilled opticians may encounter such drawbacks during the installation of the eyeglass lenses, which tends to be a time-consuming process, especially when the operation is performed repeatedly during the adjustment or replacement of the lenses in the frame.

WO03058323 A1 describes a closing device for an eyeglasses frame divided into two parts for the positioning of a lens, the closing device comprising two bushings and a coupling device made up of a screw with an enlarged head and with a stem provided with a T-shaped screw which is suitable to couple the two bushings, and said bushings being provided with an internal axial slot for the passage of the stem and the T-shaped end of the screw and with a resting surface.

U.S. Pat. No. 8,485,659 B1 describes a rim lock comprising a screw that has a stopping cap for preventing said screw from falling during the opening/closing of a gap in an eyeglass frame.

It may be considered that the prior art has certain important disadvantages such as for instance, the fact that the opening of the frame's gap is limited by the length of the screw, which would restrict certain positions of the frame during lenses installation and may difficult said installation. Moreover, rim locks in the prior art that require the use of a screwdriver do not provide a system technical element that avoids the screwdriver from slipping off during the screwing, which is an apparent problem when dealing with such a small piece. Therefore, a rim lock which prevents screw loss and difficulties related with its screwing is needed by the optical industry and eyeglasses users. The present invention addresses these needs and problems.

SUMMARY

In accordance with various embodiments of the invention, a rim lock for eyeglasses is provided. There are also provided an eyeglass frame comprising said rim lock, and a method of assembly of the rim lock in the eyeglass frame.

A first aspect of the invention concerns a rim lock for an eyeglass frame, comprising: a screw which comprises a screw head and a threaded part, wherein the screw head comprises a screw drive; and a casing comprising a first portion which comprises a first side, a second side, a first hole that extends between two opposite to each other surfaces of the first side, a second hole that extends between two opposite to each other surfaces of the second side, the first and second sides being opposite to each other, and wherein the first portion defines a hollow cavity; and the casing further comprises a second portion which comprises a third hole; wherein the screw head fits in the hollow cavity with the screw drive facing the first hole, the screw head has a larger diameter than the first and second holes, the second hole is configured to allow the passage of the threaded part, and the third hole is at least partially threaded and configured for the screwing therein of the threaded part.

The rim lock of the present invention prevents the screw loss and may prevent the screwdriver's slipping off during its screwing by means of, among other features, enclosing the screw head of the screw in the first portion of the casing, the screw drive of which remains accessible through the first hole. When the screw head is inside the hollow cavity of the first portion of the casing, it is prevented or inhibited from falling. The rim lock of the present invention facilitates screwing of the rim lock's screw by the opticians or eyeglasses' users because the screw is inhibited from falling and the screwdriver's slipping off may be prevented during the screwing of the screw. In the rim lock according to the invention, the screw head inside the first portion of the casing may adopt an advantageous position for the screwing, that is, the screw may be at least partially kept along a first direction. In such configuration, the screw drive may be at least partially facing the first hole. Furthermore, the threaded part may be passing through the second hole of the first portion of the casing, which also can serve for avoiding the screw being adopting or entering into wrong positions or directions. In the rim lock according to the invention the screw may be readily available for its screwing into the third hole of the casing's second portion. Consequently, the screw may at least partially extend along a first direction due to the configuration of the first portion of the casing, i.e., the first portion of the casing may keep one end of the screw at least partially facing the second portion of the casing. In view of the above, the time required for the screwing of the screw and the installation of lenses in an eyeglass frame is considerably reduced.

The screw comprises a screw head, which in turn comprises a screw drive. The screw drive may comprise or consist of one or more shaped cavities and/or protrusions on the screw head, and particularly may allow applying torque to the screw; many different types of screw drives may be used, e.g., Slotted, Phillips, Torx types or others. The screw is prevented from falling or being lost, since the screw head may not come off, at least not easily, from the first portion of the casing.

The first side of the casing comprises two opposite surfaces, wherein a first hole extends between such opposite surfaces. The first hole of casing's first side allows the screw drive to be accessed (e.g. by a user or technician) for screwing the screw in the third hole of the second portion of the casing, and also facilitates the coupling between a screw driver's tip and the screw drive. The introduction of a screwdriver's tip, at least partially, into the first hole when tightening or loosening the screw prevents the screwdriver from slipping off. Hence, the screw drive may be reached with the tip of a screwdriver passing via the first hole. This way the screwdriver's slipping off and the unexpected movement or displacement of the screwdriver's tip may be prevented by the fact that the first hole restricts the position of the screwdriver's tip. Consequently, when the rim lock is attached or fixed to an eyeglass frame, the configuration of the casing and screw may advantageously prevent damaging of other eyeglass frame parts or even may prevent from the user accidently harming him or herself Conversely, conventional rim locks do not have a feature or element that prevents the screwdriver from slipping off.

The second side of the first portion of the casing comprises two opposite surfaces, the second hole extending between such opposite surfaces. The second hole of the second side allows the threaded part to pass through the first portion of the casing, which may contribute to maintain the screw at least partially extending along the first direction, i.e. a preferable position for its screwing. The first and second sides of the first portion of the casing are opposite to each other and thus, the first and second holes may also be opposite to each other such that, when the screw head is inside the hollow cavity, the screw drive may face the first hole and the threaded part passes through the second hole.

The hollow cavity encloses the screw head, and in an embodiment, the hollow cavity may enclose the screw head and a portion of the threaded part. The second portion of the casing comprises a third hole to which the screw may be screwed for joining or bringing together the first and second portions of the casing. That is, when the screw is tightened, the first and second portions of the casing may approach each other. Conversely, when the screw is loosened, the first and second portion of the casing may move away from each other. The screw head has a larger diameter than the first and second holes, which is meant to avoid the screw head from coming out the first portion of the casing through said first and second holes, at the same time that the screw drive is accessible through the first hole and the second hole is configured to allow the passage of the threaded part. The third hole is at least partially threaded and configured for the screwing therein of the threaded part, allowing the joining of the two portions of the casing. The manufacture of the first and second portion of the casing may be made following any conventional technique such as moulding, milling or threading or other and combinations thereof, nevertheless techniques such as 3D printing may also be used. The use of 3D printing may allow to adopt configurations by which conventional techniques may be time-consuming or technically difficult in comparison, such as for instance, a configuration wherein the first and second portions of the casing may be hold together by an internal connecting portion of the casing.

In a preferred embodiment, the first and second portions of the casing may be two respective pieces which are joinable and separable with/from each other. In other words, the first and second portion of the casing may be two separated pieces which are joinable upon screwing of the screw in the third hole of the second portion of the casing. In some examples of prior art, the distance between two separated parts in an eyeglass frame is limited by the length of the screw of the rim lock that joins both parts. In the present invention, the distance between two separated parts in an eyeglass frame may not be limited by the length of the screw. This technical effect may be achieved by having two independent pieces (first and second portion of the casing) that may be joinable by means of the screw. Preferably, when the rim lock of the present invention is totally opened, i.e. when the screw is totally untightened or loosened, it may allow the separation of the first and second portions of the casing without any risk that the screw becomes lost. Advantageously, when the rim lock of the present invention is at least partially opened, i.e. when the screw is at least partially untightened or loosened, it may also allow the separation of the first and second portions of the casing, and thus it may allow, when each of the portions of the casing is attached to two parts in an eyeglass frame, the separation of the two parts of an eyeglass frame to which each of the portions of the casing is attached.

In an embodiment of the invention, the first portion of the casing may further comprise a third side that is adjacent to the second side, and the first portion may comprise an aperture in the third side, the aperture being continuous with the second hole and configured to allow the insertion of the screw head into the first portion of the casing. The aperture in the third side, the aperture being continuous with the second hole, may allow the insertion of the screw head in the hollow cavity of the first portion of the casing. The aperture being continuous with the second hole means that both may form a single opening that extends from the third side to the second side or vice versa, which allows the insertion of the screw head in the hollow cavity. The screw head being inside the hollow cavity of the first portion of the casing may be prevented from falling or falling easily, preferably from falling. When the first portion of the casing is attached to an eyeglass frame part through at least the third side, the aperture may be partially covered by the eyeglass frame part, preventing the screw from falling. In other embodiments, the first portion of the casing may further comprise a lid configured to cover at least partially the aperture of the first portion of the casing, preventing the screw from getting out from the hollow cavity and falling.

In an embodiment of the invention, the rim lock may further have a surface which extends across the first and second portions and is preferably flat. The surface which extends across the first and second portions of the casing may have any shape configured for improving the attachment of the rim lock to an eyeglass frame; the shape of the surface may be adapted to the part of the eyeglass frame to which the rim lock may be attached or fixed. The fact that the surface may extend across the first and second portions of the casing means that, when the first and second portions of the casing are joined, i.e. when the screw is tightened, the surface may be common to both portions.

According to an embodiment, the casing may be metallic. The casing of the present invention being metallic, e.g., made from aluminium, steel, titanium, beryllium, alloys such as Monel, or others, may allow the welding of the first and second portions of the casing to a metallic eyeglass frame.

In other embodiments, the casing may be made of any material provided the screwing of the screw into the second portion of the casing is allowed, such as polymers, e.g., cellulose acetate, or wood.

The invention in its second aspect concerns an eyeglass frame comprising at least one rim lock, preferably two rim locks, as described in any of the embodiments above. The rim lock of the present invention prevents the loss of the screw, for instance during the installation of the lenses in an eyeglass frame or in the event that the screw is loosened during use of the eyeglasses, since the screw head of the rim lock's screw is inserted or fitted in the first portion of the casing.

In a preferred embodiment, each of the at least one rim lock may join a respective first part of the eyeglass frame to a respective second part of the eyeglass frame, and the first portion of the rim lock may be attached to the respective first part, and the second portion may be attached to the respective second part. In other words, the casing's first portion of each of the one or more rim locks may be attached or fixed to a respective first part of an eyeglass frame, the casing's second portion of each of the one or more rim locks may be attached or fixed to a respective second part of an eyeglass frame, wherein each of the one or more rim locks may connect the respective first and second parts of the eyeglass frame. Therefore, when the screw of each of the one or more rim locks is completely screwed in their respective third hole of the second portion of the casing, the first and second parts of the eyeglass frame may be joined.

According to an embodiment, the eyeglass frame may comprise two rim locks and further comprises two lenses, and each of the two rim locks is adjacent to a corresponding one of the two lenses. Therefore, the two rim locks being adjacent to a corresponding one of the two lenses means that the first portion of each of the two rim locks may be attached to a respective first part and each of the second portion of the two rim locks may be attached to a respective second part, wherein the respective first and second parts are adjacent to the corresponding one of the two lenses. The first and second portions of the casing, and consequently the first and second parts of the eyeglass frame, may be joined upon screwing of the screw in the third hole of the second portion of the casing. In this case, the lenses may be locked in the eyeglass frame, preventing them from falling. Likewise, when the screw is at least partially untightened, the first and second part of the eyeglass frame may be separated, and the lenses removed from the eyeglass frame. Therefore, a pair lenses may be installed when the screw of each of one or more rim locks is partially screwed, as well as when the screw of each of one or more rim locks is not screwed.

In an embodiment wherein the first portion of the casing comprises a third side that is adjacent to the second side, and the first portion comprises an aperture in the third side, the aperture being continuous with the second hole and configured to allow the insertion of the screw head into the first portion of the casing, the at least one rim lock's screw head may be in the hollow cavity, and the respective first part of the eyeglass frame may cover at least partially the rim lock's aperture and may block the screw head from exiting the hollow cavity through the aperture. Therefore, the eyeglass frame may prevent the screw from getting out through the aperture and falling. Preferably, upon attachment of the rim lock in an eyeglass frame, the screw may not come off or be removed unless the rim lock is detached from the eyeglass frame.

A third aspect of the invention relates to a method of assembly of a rim lock which is according to any the embodiments above, in an eyeglass frame which is according to any of the embodiments above, the method comprising the steps of: attaching or fixing each of the first and second portion of the casing to the eyeglass frame; and screwing the screw into the third hole of the second portion of the casing. Therefore, each of the first and second portions of the casing may be attached or fixed to a first and second parts, respectively, of an eyeglass frame. Consequently, the method allows for joining two parts of an eyeglass frame upon screwing of the screw in the third hole.

According to an embodiment wherein the first portion of the casing comprises a third side that is adjacent to the second side and the first portion comprises an aperture in the third side, the aperture being continuous with the second hole and configured to allow the insertion of the screw head into the first portion of the casing, the method may further comprise inserting the screw head in the hollow cavity of the first portion of the casing, preferably before attaching or fixing each of the first and second portion. In this way, the eyeglass frame may prevent the screw head from exiting the casing. According to another embodiment, the method may further comprise placing lenses in the eyeglass frame before screwing the rim lock's screw into the third hole.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF THE EMBODIMENTS

Figure 1:
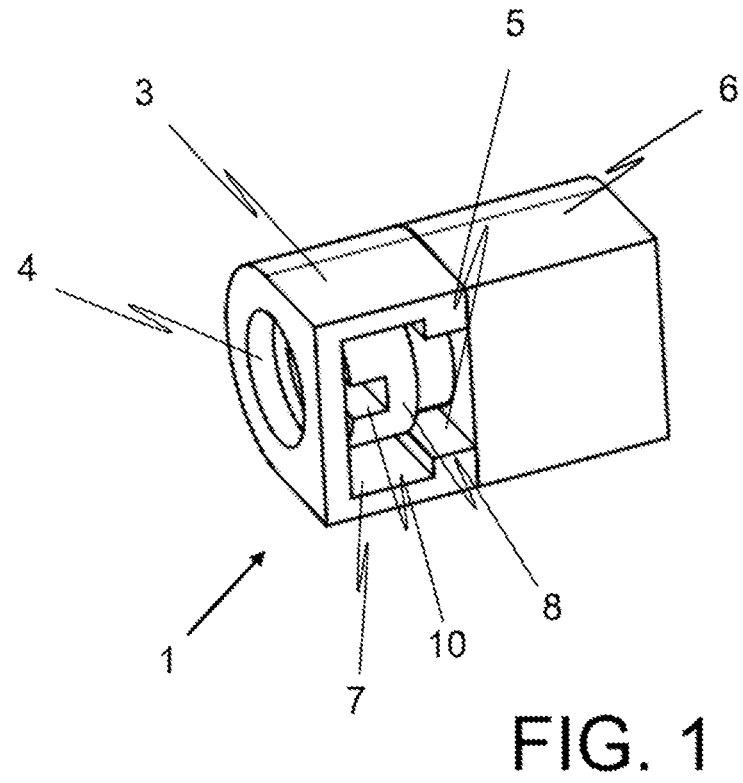
FIG. 1 is a rear perspective view of an embodiment of a rim lock according to the invention.
Figure 2:
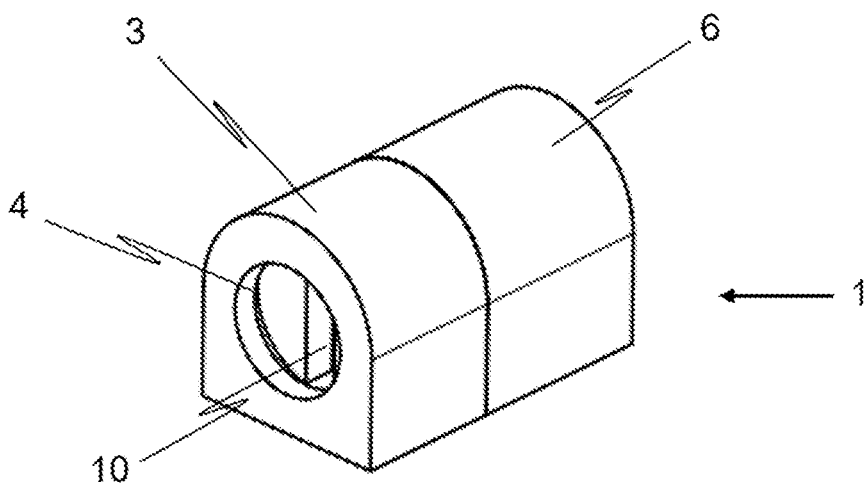
FIG. 2 is a front perspective view of an embodiment of a rim lock according to the invention.
Figure 3:
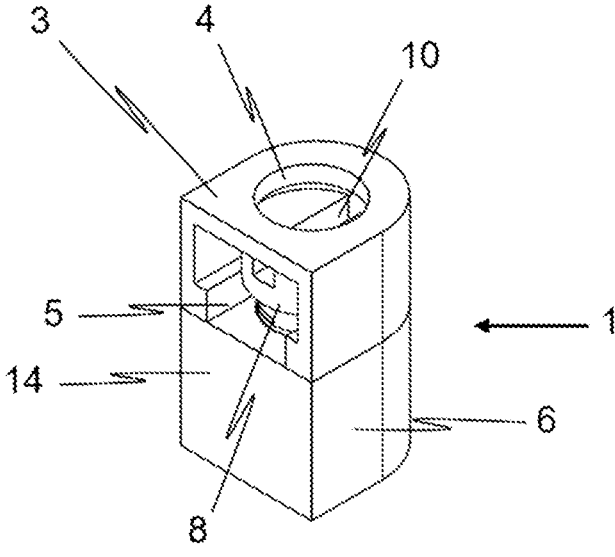
FIG. 3 is a rear perspective view of an embodiment of a rim lock according to the invention.
Figure 4:
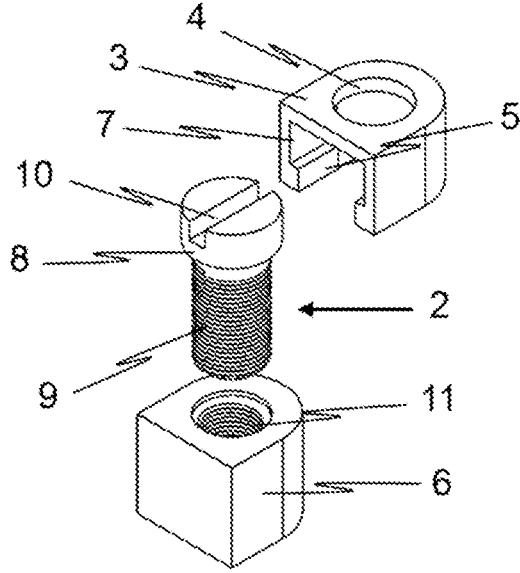
FIG. 4 is an exploded view of an embodiment of a rim lock according to the invention.
Figure 5:
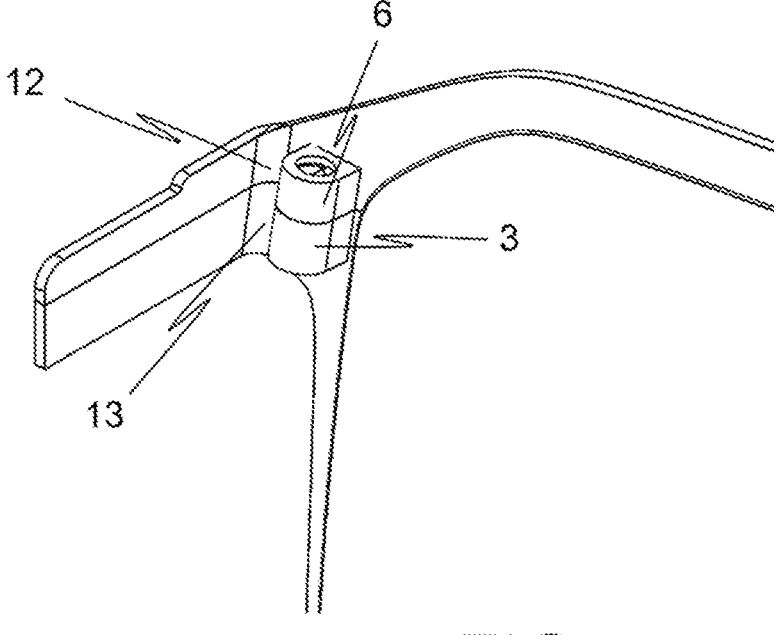
FIG. 5 is a rear perspective view of an embodiment of a rim lock according to the invention in an eyeglass frame.

Reference is made to FIG. 1-3, which show perspective views of an embodiment of a rim lock according to the invention, and FIG. 4, which show an exploded view of said embodiment. As it can be seen in FIG. 1 to 4, the rim lock 1 for an eyeglass frame comprises a screw 2 which comprises a screw head 8 and a threaded part 9, wherein the screw head 8 comprises a screw drive 10; and a casing comprising a first portion 3 which comprises a first side, a second side, a first hole 4 that extends between two opposite to each other surfaces of the first side, a second hole 5 that extends between two opposite to each other surfaces of the second side, the first and second sides being opposite to each other, and wherein the first portion 3 defines a hollow cavity; and the casing further comprises a second portion 6 which comprises a third hole 11; wherein the screw head 8 fits in the hollow cavity with the screw drive 10 facing the first hole 4, the screw head 8 has a larger diameter than the first and second holes 4 and 5, the second hole 5 is configured to allow the passage of the threaded part 9, and the third hole 11 is at least partially threaded and configured for the screwing therein of the threaded part 9. The screw 2 in the embodiment of FIG. 1-4 is prevented from falling easily, since the screw head 8 is fitted in the hollow cavity of the first portion 3 of the casing. Likewise, the screw head 8 fitted or inserted in the first portion 3 of the casing makes that the screw 2 may adopt an advantageous position for the screwing, that is, the screw 2 may be at least partially kept along a first direction. It is also contemplated that the first portion 3 of the casing may enclose the screw head 8 and portion of the threaded part 9 of the screw 2. When the rim lock 1 is attached or fixed in an eyeglass frame, as shown in FIG. 5, the screw is prevented from falling.

In the embodiment of FIG. 1-4, the first and second portions 3 and 6 of the casing are two respective pieces which are joinable and separable with/from each other. As it can be understood, the pieces are joinable with each other by means of screwing the screw 2 into the third hole 11 of the second portion 6 of the casing. In other words, a surface of the first portion 3 may remain in contact with a surface of the second portion 6 of the casing upon tightening of the screw 2. However, there may be used any other element that connects the first and second portions 3 and 6 of the casing, such as an additional portion of the casing, e.g., a connecting portion, external or internal, which may be for instance a flat elongated piece connected or attached to the first 3 and second 6 portions of the casing.

The casing in the embodiment of FIG. 1-4 comprises a third side that is adjacent to the second side, and the first portion comprises an aperture 7 in the third side, the aperture 7 being continuous with the second hole 5 and configured to allow the insertion of the screw head 8 into the first portion 3 of the casing. In other words, the opening formed by the aperture 7 and the second hole 5 allow the insertion of the screw head 8 in the hollow cavity. However, it is also contemplated that the third side of the first portion 3 of the casing does not comprise the aperture 7. In other words, it is contemplated in other embodiments that said first portion 3 may be made by shaping it around the screw head 8, not requiring the presence of the aperture 7 for inserting the screw head 8 in the hollow cavity.

In the embodiment of FIG. 1-4, the rim lock 1 has a surface 14 which extends across the first 3 and second 6 portions and is flat. However, it is contemplated that this surface may have any shape configured for improving the attachment of the rim lock to an eyeglass frame, e.g., a concave surface. Therefore, the geometry of the surface may be adapted to the part of the eyeglass frame to which the rim lock may be attached or fix.

The casing of the rim lock in FIG. 1-4 is metallic, nevertheless it may be made from other materials such as polymers, e.g., cellulose acetate, or wood.

The embodiment of FIG. 5 shows an eyeglass frame eyeglass frame comprising one rim lock 1 according to the previous embodiments. However, the eyeglass frame may comprise more than one rim lock 1, preferably two. The rim lock 1 of FIG. 5 joins a respective first part 12 of the eyeglass frame to a respective second part 13 of the eyeglass frame with the first portion 3 of the rim lock 1 being attached to the respective first part 12 and the second portion 6 being attached to the respective second part 13. Nonetheless the embodiment of FIG. 5 shows one rim lock 1 in the eyeglass frame, the latter may comprise more than one rim lock 1, preferably two, which join a respective first part 12 of the eyeglass frame to a respective second part 13 of the eyeglass frame. Preferably, the eyeglass frame comprises two rim locks 1 and further comprises two lenses, and each of the two rim locks 1 is adjacent to a corresponding one of the two lenses. As it can be understood from the embodiment of FIG. 5, the one or more rim locks being adjacent to a corresponding one of the two lenses means that the first portion 3 of each of the one or more rim locks may be attached to a respective first part 12, and each of the second portion 6 may be attached to the respective second part 13, wherein the respective first 12 and second 13 parts are adjacent to the corresponding one of the two lenses. The screwing of each of the screws may allow to regulate the gap distance between the respective first 12 and second 13 parts of the eyeglass frame. In other words, upon tightening or loosening of the rim lock's screw 2, the first 12 and second 13 parts of the rim locks may be joined or separated, allowing in turn the installation of the lenses in the eyeglass frame when the screw is partially or totally unscrewed.

Reference is made to FIG. 5, which show an embodiment wherein the rim lock 1 is according to FIG. 1-3, with its screw head 8 being in the hollow cavity, and the respective first part 12 of the eyeglass frame covers the rim lock's aperture 7 and blocks the screw head 8 from exiting the hollow cavity through the aperture 7. However, it is also contemplated that the screw head 8 may be blocked from exiting the hollow cavity through the aperture 7 when the eyeglass frame partially covers the rim lock's aperture 7. It is also contemplated that a lid may be used for blocking the screw head 8 from exiting the hollow cavity.

The rim lock of FIG. 5 has been assembled in the eyeglass frame following a method that comprises the steps of attaching or fixing each of the first 3 and second 6 portion of the casing to the eyeglass frame; and screwing the screw 2 into the third hole 11 of the second portion 6 of the casing. The method further comprises inserting the screw head 8 in the hollow cavity of the first portion 3 of the casing, preferably before attaching or fixing each of the first 3 and second 6 portions. In other embodiments where the first portion of the casing does not comprise an aperture, it is contemplated that the screw head 8 is inserted in the first portion of the casing while the first portion of the casing is manufactured. The method may further comprise placing lenses in the eyeglass frame before screwing the rim lock's screw 2 into the third hole 11. Therefore, it may be understood that the screw is loosened or non-screwed before inserting the lenses and afterwards, the screw is tightened or screwed in the third hole of the second portion of the casing for locking the lenses in the desired position.

Those skilled in the art will appreciate that the conception, upon which this disclosure is based, may readily be utilized as a basis for the designing of other devices, methods and systems for carrying out the several purposes of the present invention. It is important, therefore, that the claims be regarded as including such equivalent constructions insofar as they do not depart from the scope of the present invention.

The invention claimed is:

1. A rim lock for an eyeglass frame, comprising:
  a screw which comprises a screw head and a threaded part, wherein the screw head comprises a screw drive; and
  a casing comprising:
    a first portion which comprises: a first side wall with mutually opposite outer and inner surfaces and a first hole extending between the outer and inner surfaces of the first side wall; a second side wall opposite the first side wall with mutually opposite outer and inner surfaces and a second hole extending between the outer and inner surfaces of the second side wall; and a hollow cavity arranged between the inner surfaces of the first and second side walls; and
    a second portion which comprises a third hole;
  wherein the hollow cavity is configured to receive the screw head with the screw drive facing the first hole, the screw head has a larger minimum diameter than minimum diameters of the first and second holes, the second hole is configured to allow the passage of the threaded part, and the third hole is at least partially threaded and configured to threadably receive the threaded part;

wherein the first portion and the second portion of the casing are configured to be coupled to the eyeglass frame to form an assembled configuration of the casing and eyeglass frame; and wherein, in the assembled configuration, the outer surface of the second side wall of the first portion abuts an outer surface of a side wall of the second portion in which an opening of the third hole is defined.

2. The rim lock according to claim 1, wherein the first and second portions of the casing are two respective pieces which are configured to be joinable and separable with/from each other.

3. The rim lock according to claim 1, wherein the first portion of the casing further comprises a third side configured as a lateral side of the first portion arranged between the first side and the second side, wherein the third side comprises an aperture, the aperture being configured as a lateral access to both the second hole and the hollow cavity to allow the screw head to be laterally inserted into the first portion of the casing.

4. The rim lock according to claim 1, further comprising a surface which extends across the first and second portions.

5. The rim lock according to claim 1, wherein the casing is metallic.

6. An eyeglass frame comprising at least one rim lock, the rim lock comprising a screw which comprises a screw head and a threaded part, wherein the screw head comprises a screw drive; and a casing comprising:

a first portion which comprises: a first side wall with mutually opposite outer and inner surfaces and a first hole extending between the outer and inner surfaces of the first side wall; a second side wall opposite the first side wall with mutually opposite outer and inner surfaces and a second hole extending between the outer and inner surfaces of the second side wall; and a hollow cavity arranged between the inner surfaces of the first and second side walls; and a second portion which comprises a third hole;

wherein the hollow cavity is configured to receive the screw head with the screw drive facing the first hole, the screw head has a larger minimum diameter than minimum diameters of the first and second holes, the second hole is configured to allow the passage of the threaded part, and the third hole is at least partially threaded and configured to threadably receive the threaded part;

wherein the first portion and the second portion of the casing are configured to be coupled to the eyeglass frame to form an assembled configuration of the casing and eyeglass frame; and wherein, in the assembled configuration, the outer surface of the second side wall of the first portion abuts an outer surface of a side wall of the second portion in which an opening of the third hole is defined.

7. The eyeglass frame according to claim 6, wherein each of the at least one rim lock joins a respective first part of the eyeglass frame to a respective second part of the eyeglass frame, and the first portion of the rim lock is attached to the respective first part, and the second portion is attached to the respective second part.

8. The eyeglass frame according to claim 7, wherein the eyeglass frame comprises two rim locks and further comprises two lenses, and each of the two rim locks is adjacent to a corresponding one of the two lenses.

9. The eyeglass frame according to claim 7, wherein first portion of the casing further comprises a third side forming a lateral side of the first portion arranged between the first side and the second side, wherein the third side comprises an aperture configured as a lateral access to both the second hole and the hollow cavity to allow the screw head to be inserted into the hollow cavity, wherein the first portion of the casing is configured to be joined to the first part of the eyeglass frame by attaching the third side to the first part of the eyeglass frame after the screw head has been inserted into the hollow cavity through the aperture, such that, when in the assembled configuration, the respective first part of the eyeglass frame at least partially covers the aperture of the third side preventing the screw head from exiting the hollow cavity through the aperture.

10. A method of assembly of a rim lock to an eyeglass frame, the rim lock comprising a screw which comprises a screw head and a threaded part, wherein the screw head comprises a screw drive; and a casing comprising:

a first portion which comprises: a first side wall with mutually opposite outer and inner surfaces and a first hole extending between the outer and inner surfaces of the first side wall; a second side wall opposite the first side wall with mutually opposite outer and inner surfaces and a second hole extending between the outer and inner surfaces of the second side wall; and a hollow cavity arranged between the inner surfaces of the first and second side walls;

a second portion which comprises a third hole;

wherein the hollow cavity is configured to receive the screw head with the screw drive facing the first hole, the screw head has a larger minimum diameter than minimum diameters of the first and second holes, the second hole is configured to allow the passage of the threaded part, and the third hole is at least partially threaded and configured to threadably receive the threaded part;

the method comprising the steps of:

attaching or fixing each of the first and second portion of the casing to the eyeglass frame to form an assembled configuration of the casing and eyeglass frame; and screwing the screw into the third hole of the second portion of the casing;

wherein, in the assembled configuration, the outer surface of the second side wall of the first portion abuts an outer surface of a side wall of the second portion in which an opening of the third hole is defined.

11. A method of assembly of a rim lock according to claim 10, wherein the rim lock further comprises the first portion of the casing further comprising a third side forming a lateral side of the first portion arranged between the first side and the second side, wherein the third side comprises an aperture configured as a lateral access to both the second hole and the hollow cavity to allow the screw head to be inserted into the hollow cavity, the method further comprising inserting the screw head into the hollow cavity thorough the aperture of the first portion of the casing, before the step of attaching or fixing each of the first and second portion of the casing to the eyeglass frame.

12. The method of assembly according to claim 10, further comprising placing lenses in the eyeglass frame before screwing the rim lock's screw into the third hole.

* * * * *